(12) United States Patent
Callahan

(10) Patent No.: US 9,807,551 B2
(45) Date of Patent: *Oct. 31, 2017

(54) LOCATION-SPECIFIC DATA ACQUISITION

(71) Applicant: One, Inc., San Francisco, CA (US)

(72) Inventor: Michael Callahan, San Francisco, CA (US)

(73) Assignee: One, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/077,095

(22) Filed: Mar. 22, 2016

(65) Prior Publication Data

US 2016/0205515 A1    Jul. 14, 2016

Related U.S. Application Data

(63) Continuation of application No. 13/975,326, filed on Aug. 24, 2013, now Pat. No. 9,294,872, which is a continuation-in-part of application No. 12/687,721, filed on Jan. 14, 2010, now Pat. No. 8,898,250.

(60) Provisional application No. 61/693,242, filed on Aug. 24, 2012, provisional application No. 61/144,614, filed on Jan. 14, 2009.

(51) Int. Cl.
| | |
|---|---|
| G06F 15/16 | (2006.01) |
| H04W 4/02 | (2009.01) |
| H04W 4/04 | (2009.01) |
| H04W 24/00 | (2009.01) |
| H04W 48/10 | (2009.01) |
| H04L 29/08 | (2006.01) |
| G06Q 30/02 | (2012.01) |
| H04W 4/00 | (2009.01) |

(52) U.S. Cl.
CPC .............. *H04W 4/02* (2013.01); *G06Q 30/02* (2013.01); *H04L 67/18* (2013.01); *H04L 67/20* (2013.01); *H04L 67/22* (2013.01); *H04L 67/306* (2013.01); *H04W 4/008* (2013.01); *H04W 4/023* (2013.01); *H04W 4/043* (2013.01); *H04W 24/00* (2013.01); *H04W 48/10* (2013.01)

(58) Field of Classification Search
None
See application file for complete search history.

(56) References Cited

U.S. PATENT DOCUMENTS

| | | | |
|---|---|---|---|
| 7,711,103 | B2 | 5/2010 | Culbertson et al. |
| 7,739,144 | B2 | 6/2010 | Coutts et al. |
| 7,774,233 | B2 | 8/2010 | Barber et al. |
| 2002/0010775 | A1 | 1/2002 | Rakavy et al. |
| 2005/0188062 | A1 | 8/2005 | Li et al. |
| 2007/0036336 | A1 | 2/2007 | Wimmreuter |
| 2007/0051802 | A1 | 3/2007 | Barber et al. |
| 2007/0093258 | A1 | 4/2007 | Steenestra et al. |

(Continued)

*Primary Examiner* — Peling Shaw
(74) *Attorney, Agent, or Firm* — McAndrews, Held & Malloy

(57) ABSTRACT

Devices, methods, and systems are provided that allow for acquiring and/or communicating data associated with a location. Embodiments of the present invention allow a mobile communication device to detect a sensor associated with a particular location, and information about that location is provided to the mobile communication device. Other embodiments allow data to be detected and processed in order to characterize a location and objects contained therein.

20 Claims, 4 Drawing Sheets

(56) References Cited

U.S. PATENT DOCUMENTS

| | | | |
|---|---|---|---|
| 2008/0042840 A1* | 2/2008 | Christopher | G06Q 30/02 340/572.1 |
| 2008/0057915 A1 | 3/2008 | Lahtiranta et al. | |
| 2008/0062919 A1 | 3/2008 | Chen et al. | |
| 2008/0103850 A1 | 5/2008 | Shen | |
| 2008/0120375 A1 | 5/2008 | Levy | |
| 2008/0157961 A1 | 7/2008 | Park et al. | |
| 2008/0182588 A1 | 7/2008 | Aaron | |
| 2008/0214210 A1 | 9/2008 | Rasanen et al. | |
| 2008/0281668 A1 | 11/2008 | Nurminen | |
| 2008/0288354 A1 | 11/2008 | Finn et al. | |
| 2008/0300985 A1 | 12/2008 | Shamp et al. | |
| 2008/0318671 A1 | 12/2008 | Rowe et al. | |
| 2009/0031258 A1 | 1/2009 | Arrasvuori et al. | |
| 2009/0070681 A1 | 3/2009 | Dawes et al. | |
| 2009/0089166 A1 | 4/2009 | Happonen | |
| 2009/0157473 A1 | 6/2009 | Belz et al. | |
| 2009/0187463 A1 | 7/2009 | DaCosta | |
| 2010/0255856 A1 | 10/2010 | Kansai et al. | |
| 2010/0312646 A1 | 12/2010 | Gupta et al. | |
| 2011/0270135 A1 | 11/2011 | Dooley et al. | |
| 2012/0102409 A1 | 4/2012 | Fan et al. | |
| 2013/0065603 A1 | 3/2013 | Hovav | |
| 2013/0100036 A1 | 4/2013 | Papakipos et al. | |
| 2013/0194073 A1 | 8/2013 | Ramaswamy et al. | |

\* cited by examiner

LOCATION-SPECIFIC DATA ACQUISITION

CROSS-REFERENCE TO RELATED APPLICATIONS

This application is a continuation of application Ser. No. 13/975,326, now U.S. Pat. No. 9,294,872, filed on Aug. 24, 2013, which claims the benefit of provisional U.S. patent application No. 61/693,242, filed on Aug. 24, 2012, and is a continuation-in-part of U.S. patent application Ser. No. 12/687,721, now U.S. Pat. No. 8,898,250, which claims the benefit of provisional U.S. patent application No. 61/144,614, filed on Jan. 14, 2009. Each of the above-stated applications is incorporated by reference in its entirety.

BACKGROUND OF THE INVENTION

The present invention generally relates to acquiring and/or communicating data associated with a location. More particularly, the present invention relates to devices, systems, and methods for acquiring location-related data and/or communicating data based on the detection of a device situated at a particular location. In varying embodiments, data may be acquired in a relatively passive way, such as via a stationary sensor that senses features of its surroundings, or in a more active way, such as via a sensor located on a device that may move about a location.

Data relating to a particular location may be useful for a variety of applications in which it is beneficial to characterize the dimensions, layout, or contents of a given space. To obtain a useful data set, however, the amount of data collected must be sufficiently large and must be reliable.

DETAILED DESCRIPTION OF THE INVENTION

Figure 1:
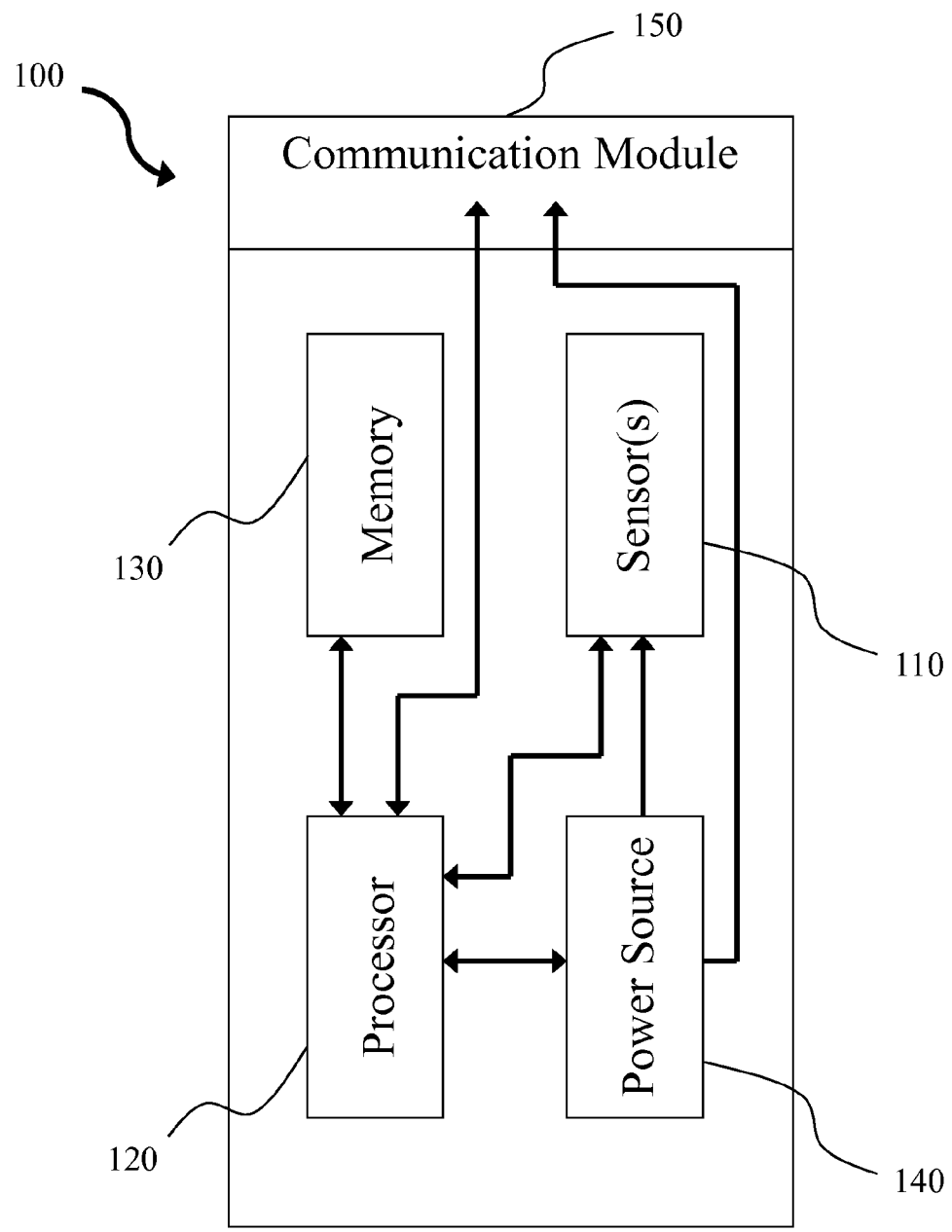
FIG. 1 illustrates a block diagram of a device according to an embodiment of the present invention.

FIG. 1 illustrates a block diagram of a device 100 according to an embodiment of the present invention. The device 100 includes one or more sensors 110, a processor 120, a memory 130, a power source 140, and a communication module 150.

The processor 120 is in bidirectional communication with the sensors 110, the memory 130, the power source 140, and the communication module 150. The power source 140 also provides power to the sensors 110 and the communication module 150.

In operation, the device 100 may be adapted to measure signal dissipation and dispersion for a variety of signal types. For example, the device 100 may be adapted to measure (or capture for later measurement) data relating to how a radiofrequency signal bounces off of objects in the surrounding environment, such as data obtained by an RFID transceiver. In an embodiment, the sensors 110 of device 100 may utilize acoustic location to obtain and/or process detected audio signals. In certain embodiments, the sensors 110 of device 100 may be adapted to capture light signals, such as ambient light levels, photos, or video of the environment, using such known technologies as photocells, cameras, transmitters, receivers, and/or transceivers. In an embodiment, the device 100 includes obstacle avoidance capabilities, such as machine vision provided by sensors 110, so that the device 100 may avoid obstacles in its path.

In certain embodiments, the devices 100 may be adapted to capture characteristics comprising a signature for a given signal or signal type. An acoustic signature, for example, may be the distribution of frequency components. In an embodiment, the sensors 110 of the device 100 may be adapted to capture, for example, an International Mobile Equipment Identity (IMEI) number, a Universal Unique Identifier (UUID), and/or a Bluetooth ID number. The sensors 110 may also be adapted to capture data relating to the interaction of a signal with the environment and/or the device. For example, a sensor 110 may be configured to sense visible or invisible light, RF, magnetic fields, wind current, and/or temperature.

In certain embodiments, the device 100 may be adapted to perform processing of data. In other embodiments, the device 100 may simply capture data that may be processed by other means, such as a personal computer or mobile device.

Figure 4:
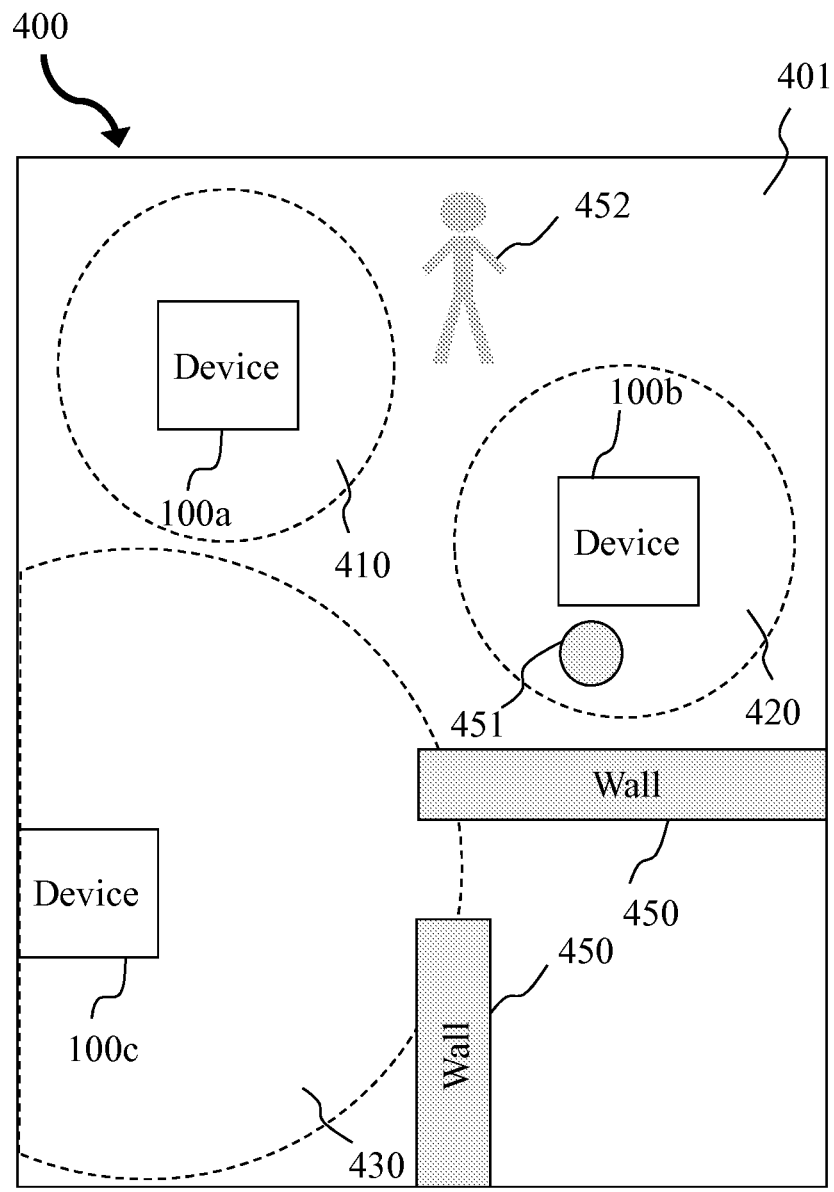
FIG. 4 illustrates an aerial view of a system according to an embodiment of the present invention.

A device 100 may also be adapted to communicate with one or more other devices 100 via the communication module 150. Such connection may be made physically, such as via an Ethernet cable, or wirelessly via a wireless network. In an embodiment, networked devices 100 may be adapted to share data and communicate with one another, for example, in order to coordinate the acquisition of data associated with a particular location. As illustrated in FIG. 4, such coordination may allow multiple devices 100 to spread out in order to map a large area and combine their data to increase the efficiency and accuracy of data acquisition. In an embodiment, the location of a device 100 may be communicated to another device 100 or location, and that other device 100 or location may perform an action based on this information. In still other embodiments, a device 100 may be detected by another sensor in the environment, such as a person's mobile communication device.

The devices 100 may also be adapted to communicate physically or wirelessly via the communication module 150, for example, with a master controller, such as a personal computer. In varying embodiments, such communication may be unidirectional (e.g., reporting of location data from the device 100 to the master controller) or bidirectional (e.g., reporting of location data from the device 100 to the master controller and sending of commands from the master controller to the device 100).

The device 100 itself may be physically configured in a variety of ways, particularly since different configurations may be preferred for different location types or applications. For example, if extremely specific and comprehensive data are needed for a crowded space, the physical configuration may differ from what would be appropriate for a large, open space that requires less precise data acquisition. As a further example, it may be sufficient to utilize a device 100 with rolling capabilities in some applications, whereas a device 100 with flying capabilities may be more appropriate for other applications. In certain embodiments, the device 100 may also be adjusted by a user in order to fit a particular application. For example, a user may adjust the measuring height of the device 100 prior to operation. Alternatively, the measuring height may be adjusted during operation of the device 100, for example, by sending a command to the device 100 over a wireless network that may be stored in the memory 130 and executed by the processor 120. In certain embodiments, the device may be incorporated into a communication device typically carried by a person, such as a mobile phone.

In an embodiment, data may be captured by auxiliary equipment, communicated from the auxiliary equipment to the device 100, and associated with the location of the device 100. For example, video captured by an auxiliary camera may be communicated to a device 100 and associated with the location of the device 100.

In certain embodiments, the device 100 may also be adapted to relocate itself to a docking station or wall outlet, for example, in order to charged or recharge the power source 140. Alternatively or in addition, the power source 140 may include one or more batteries, solar cells, or mechanical elements (e.g., flywheel) adapted to store and/or process energy. In certain embodiments, the device 100 may obtain energy from its environment, such as by using piezoelectric materials that harness vibration to charge a battery or capacitor.

Figure 2:
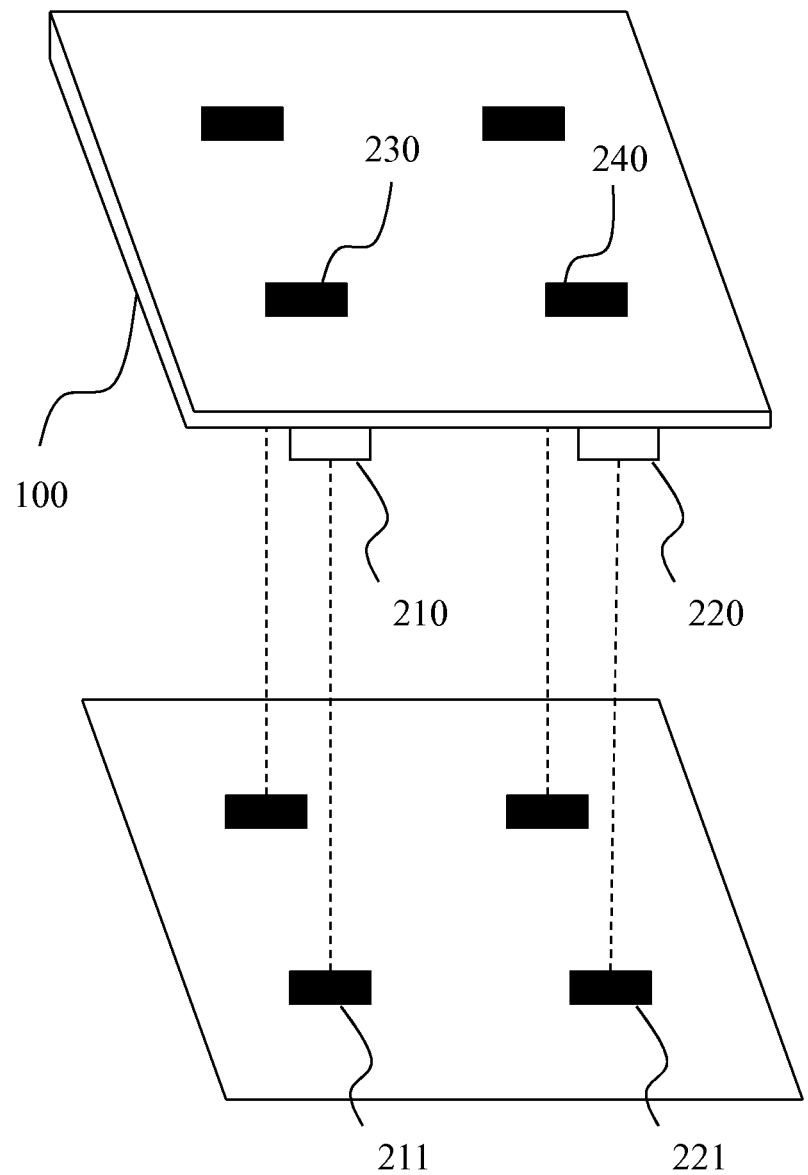
FIG. 2 illustrates a front view of a device according to an embodiment of the present invention.

In varying embodiments, the power source 140 may be internal or external to the device 100 and may be configured in a variety of ways. In an embodiment, the device 100 may be adapted to recharge itself. For example, the device may be adapted to plug into a wall outlet, providing an external power source 140 for the device 100. Such a device 100 may be configured with male and female electrical parts so that its female part may receive the male part of another electrically powered machine in order to create a daisy chain. As illustrated in FIG. 2, for example, the device 100 may be configured with male electrical contacts 210 and 220, which may be plugged into female wall outlet contacts 211 and 221, respectively. The device 100 may further include female electrical contacts 230 and 240, which may be configured to receive the male contacts of another electrically powered machine. Similarly, the device 100 may be configured for electrical communication with a fixture, such as an overhead light. Configuring devices 100 for electrical communication with fixtures such as lights or wall outlets may provide a robust power source 140 and facilitate, for example, continuous sampling for a given area.

Figure 3:
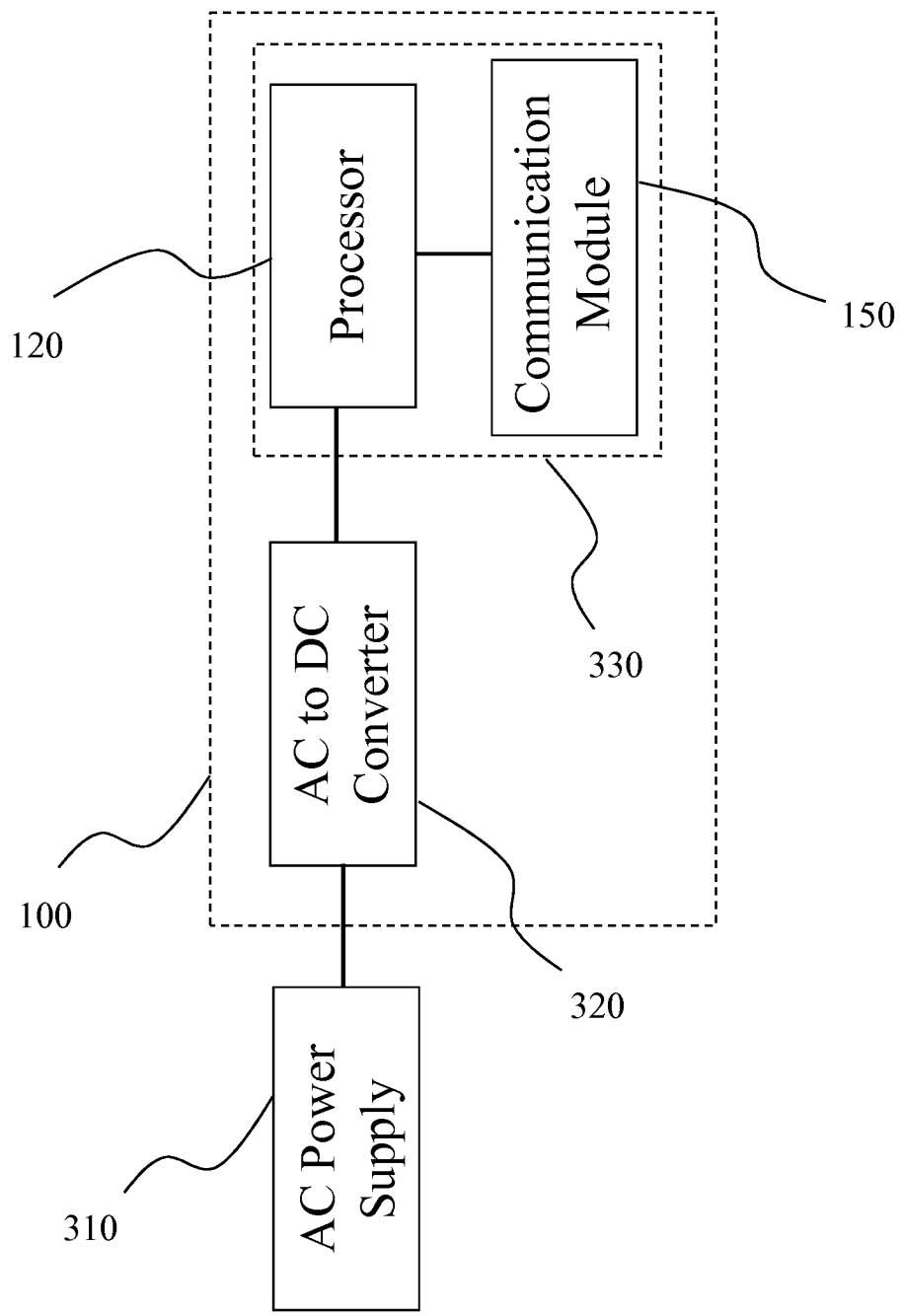
FIG. 3 illustrates a block diagram of a device according to an embodiment of the present invention.

FIG. 3 illustrates a block diagram of a device 100 according to an embodiment of the present invention. The device 100 includes an AC to DC converter 320, a processor 120, and a communication module 150. In certain embodiments, the processor 120 and the communication module 150 may be grouped together as a system on a chip (SoC) 330.

In operation, the AC to DC converter 320 receives AC power from the AC power supply 110 external to the device 100, converts the AC power to DC power, and provides DC power to the processor 120. The processor 120 provides data and/or instructions to the communication module 150, which may include, for example, a Bluetooth antenna.

In an exemplary application, one or more devices 100 may be placed in a movie theater and configured so that each broadcasts an identifier associated with the device, such as a number or alphanumeric string, using the communication module 150. When a person's mobile phone comes within geographic proximity of a device 100 located near a particular movie poster (e.g., device #12345), application software running on the mobile phone (which may itself be considered a device) may detect and/or be detected by the device 100 located near the poster. Upon this detection, the application software may contact a server containing content such as a movie trailer associated with device #12345, and this content may be provided to the person's mobile phone, potentially following the entry of a confirmation or acceptance by the person. Alternatively or in addition, content may be stored in the memory 130 and be provided directly by the device 100. In certain embodiments, the device 100 may be configured without a memory and provide no local storage of data. Provisional U.S. patent application Ser. No. 61/144,614, which is herein incorporated by reference, describes the provision of such content based upon geographic proximity. As described further in provisional U.S. patent application Ser. No. 61/144,614, the content may be personalized based on, for example, the interests or recent activity of its intended recipient.

FIG. 4 illustrates an aerial view of a system 400 according to an embodiment of the present invention. The system includes devices 100a, 100b, and 100c, which are configured to capture and provide data associated with areas 410, 420, and 430, respectively. Location 401 includes areas 410, 420, and 430.

In an embodiment, one or more robotic devices may be employed to traverse the location 401 in order to measure data about each device's location and surroundings. Such data may include, for example, the presence and/or strength of radiofrequency (RF), Bluetooth, or Wi-Fi signals. Other relevant data may include the SSIDs associated with detectable Wi-Fi hotspots.

The data obtained by the devices 100a, 100b, and 100c may be used to characterize a variety of aspects of a given area, including static objects (e.g., walls) and/or dynamic objects (e.g., people, products). As illustrated in FIG. 4, device 100c would detect the presence of walls 450 because they are located within area 430. Similarly, device 100b would detect the presence of static object 451 because it is located within area 420. Although device 100a would not detect person 452 at the instance depicted in FIG. 4, person 452 would be detected by device 100a if person 452 were to relocate inside area 410. In an embodiment, the data obtained by devices 100a, 100b, and 100c may be used to identify where power outlets are located in a particular room. On a larger scale, such devices may be used to identify and characterize the location of restrooms or restaurants in a large building or complex of buildings. As a further example, such devices may be used to characterize the specific location of a product inside a store. For example, one or more of the devices 100a, 100b, and 100c may be configurable to detect RFID tags associated with particular products inside a store.

In certain embodiments, the data set obtained by the devices 100a, 100b, and 100c may be self-healing. In an embodiment, data may be combined from multiple devices and systems in order to expand the data set. For example, device 100a may detect the presence of device 100b. Device 100b, in turn, may detect the presence of device 100c, which is not detected by device 100a. Although device 100a does not itself detect the presence of device 100c, device 100a may interact with and use data associated with device 100c because the devices 100a and 100c are linked by device 100b. Similarly, if device 100c were to detect the presence of wall 450, and device 100b were to detect device 100c but not wall 450, then device 100b may still be made aware of the location or features of wall 450 based on information it receives from device 100c. Furthermore, other data (including GPS data or data provided by humans, for example) may be incorporated into the data set acquired by the devices 100a, 100b, and 100c in order to, for example, supplement the data set or account for environmental changes.

In an embodiment, device 100a may be configured for mobility around location 401 and may determine or be provided the optimal path for mapping location 401 or some portion thereof. In varying embodiments, parameters such as the sampling rate or modality may be determined by the device 100a, an external computer, or the user. Based on data associated with and acquired by the device 100a, the area 410 covered by the device 100a may be characterized. This information may be used, for example, to create a map, 3-D reconstruction, or virtual representation of the surrounding environment. Depending on the application, it may be beneficial for the device 100a to periodically resample an area in order to obtain updated data.

In certain embodiments, additional content may be applied on top of the data in order to create a digital interface. For example, the device 100a may be used to map the interior of a store, and a digital interface based on the acquired data may allow a user to virtually traverse the location, select a product on a store shelf that was detected by the device 100a (or was added later to the data set), and purchase it. Such information may also be used, for example, to verify whether something is present at a particular location, including whether an item is in stock at a store or whether a person is currently at a particular location.

In an embodiment, real-time analytics may be applied on top of the data. For example, the device 100a may be used to create a map of an indoor location that identifies the most popular item present or where the greatest concentration of people is located. Such information may be used, for example, to evaluate the effectiveness of product placements or advertisements. Other analytics that may be relevant to an application and could be ascertained (entirely or in part) by the device 100a may include the number of people currently present at a given location, how many people have entered or left a given area, and the average length people tend to remain in a given area.

In an embodiment, one or more location triggers may be added on top of the acquired data, such that when a person with a mobile communication device is located proximate to the location associated with the trigger, content such as a text message, audio clip, photo, or video is presented to the user. Such content could include, for example, a promotional offer relevant to the location associated with the trigger.

In an embodiment, the device 100a may also be used to monitor a particular location, for example, for purposes of obtaining news information or streaming a live video or audio feed. Such data may be received and transmitted, for example, in real-time or near real-time.

In certain embodiments, the device 100a may be adapted to communicate directly with a person in order to provide the person with information about the location 401, which may include, for example, an advertisement or an announcement about an upcoming event. For example, a person 452 may approach the device 100a and ask it where the nearest restroom is. Using the data set acquired by or accessible to it, the device 100a may answer the person's question. Such an answer may be presented visually or audibly by the device 100a, or the device 100a may communicate the information to the person's mobile communication device via text message, for example. In an embodiment, information may be presented visually via an overlay associated with, for example, a heads-up display, a contact lens, or a device such as Google's Glass™ product. In another embodiment, the information may be communicated directly to the person's brain using known invasive or non-invasive techniques.

As a further example, the data acquired by a device 100a may be used to provide navigation information, such as the directions to a particular gate within an airport.

The device 100a may also be adapted to place markers that may be used in acquiring data to characterize the location 401. For example, the device 100a may be adapted to place RF beacons onto walls or into wall outlets or light fixtures.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

What is claimed is:

1. A device for sensing location-related data including:
    a sensor configurable to detect data associated with a location, wherein the detected location data includes the presence of a mobile communication device;
    a memory configurable to store the detected location data;
    a processor configurable to process the detected location data; and
    a communications module that is operable to communicate content that corresponds to an object at or near the location to the mobile communication device.

2. The device of claim 1, wherein the sensor is configurable to detect at least one of light, sound, radio frequency (RF) signals, magnetic fields, wind current, temperature, and wireless network signals.

3. The device of claim 1, wherein the device is configurable to communicate the detected location data to the mobile communication device in real-time or near real-time.

4. The device of claim 1, wherein the device is configurable to communicate with a second device.

5. A method for providing content associated with a location, the method including:
    detecting a device associated with an object, wherein the detection is performed by a mobile communication device when the mobile communication device and the device associated with the object are geographically proximate to one another, and wherein the device associated with the object is further associated with a unique identifier; and
    providing content related to the object to the mobile communication device subsequent to the detection, wherein the content is provided by a remote server.

6. The method of claim 5, wherein the mobile communication device prompts for a confirmation prior to the content being provided to the mobile communication device.

7. A system for sensing location-related data including:
    a device for sensing location-related data, wherein the device includes a sensor configurable to detect data associated with a location and a processor configurable to process the detected location data, and wherein the detected location data is configurable to characterize the location and at least one object contained therein.

8. The system of claim 7, wherein a map is generated based at least in part on the detected location data.

9. The system of claim 8, wherein the map is configurable to be overlaid with analytical data.

10. The system of claim 7, wherein the location is indoors.

11. The system of claim 7, wherein the device is configurable to communicate with one another in order to coordinate which device will detect data associated with which portion of the location.

12. The system of claim 7, wherein the location data detected by the device is configurable to be combined with the location data detected by a second device.

13. The system of claim 7, wherein the device is capable of movement within the location.

14. The system of claim 13, wherein the device is configurable to determine a path for the movement of the device.

15. The system of claim 7, wherein at least one capability of the device is controlled by a master controller.

16. The system of claim 7, wherein the device is powered by a rechargeable power source.

17. The system of claim 7, wherein the device is configurable to recharge its power source.

18. The system of claim 17, wherein the device is powered by a wall outlet.

19. A device for broadcasting an identifier, the device comprising:
   a memory configurable to store an identifier associated with the device;
   an AC to DC converter for charging a battery in the device;
   an antenna configurable to transmit the identifier; and
   a processor configurable to communicate with the memory and antenna for transmission of the identifier, wherein the device is configurable to be powered by the battery.

20. The device of claim 19, wherein the power source is configurable to obtain energy from the environment surrounding the device.

* * * * *